United States Patent
Jordan

(10) Patent No.: US 7,442,736 B2
(45) Date of Patent: Oct. 28, 2008

(54) USE OF NUCLEATING AGENTS TO INCREASE THE FLEXURAL MODULUS OF IONOMERS

(75) Inventor: Michael D. Jordan, Newport, RI (US)

(73) Assignee: Acushnet Company, Fairhaven, MA (US)

( * ) Notice: Subject to any disclaimer, the term of this patent is extended or adjusted under 35 U.S.C. 154(b) by 416 days.

(21) Appl. No.: 11/149,024

(22) Filed: Jun. 9, 2005

(65) Prior Publication Data

US 2006/0281585 A1 Dec. 14, 2006

(51) Int. Cl.
*A63B 37/12* (2006.01)
*A63B 37/00* (2006.01)
*C08K 5/1575* (2006.01)

(52) U.S. Cl. .................. 524/108; 473/373; 473/385

(58) Field of Classification Search .............. None
See application file for complete search history.

(56) References Cited

U.S. PATENT DOCUMENTS

| 3,262,272 | A | | 7/1966 | Barakauskas et al. |
|---|---|---|---|---|
| 3,264,272 | A | | 8/1966 | Rees |
| 3,421,766 | A | | 1/1969 | Chmiel et al. |
| 4,351,931 | A | | 9/1982 | Armitage |
| 4,839,116 | A | * | 6/1989 | Puckett et al. ............... 264/45.3 |
| 4,884,814 | A | | 12/1989 | Sullivan |
| 4,911,451 | A | | 3/1990 | Sullivan et al. |
| 4,984,804 | A | * | 1/1991 | Yamada et al. .............. 473/372 |
| 5,973,046 | A | * | 10/1999 | Chen et al. ................... 524/300 |
| 6,267,693 | B1 | | 7/2001 | Sullivan |
| 6,800,690 | B2 | | 10/2004 | Rajagopalan et al. |
| 6,855,076 | B2 | | 2/2005 | Matroni et al. |
| 2003/0008975 | A1 | * | 1/2003 | Takesue et al. .............. 525/125 |
| 2004/0213944 | A1 | | 10/2004 | Mientus et al. |
| 2004/0266559 | A1 | | 12/2004 | Askura |
| 2005/0020741 | A1 | | 1/2005 | Chen |

FOREIGN PATENT DOCUMENTS

| GB | 963380 | | 7/1964 |
|---|---|---|---|
| JP | 57008232 | * | 1/1982 |
| JP | 60014878 | * | 1/1985 |

* cited by examiner

*Primary Examiner*—David Buttner
(74) *Attorney, Agent, or Firm*—Mandi B. Milbank

(57) ABSTRACT

A golf ball composition having a copolymer with an acid content modified by a nucleating agent is described. The nucleating agent modifies the flexural modulus of the acid copolymer.

8 Claims, No Drawings

USE OF NUCLEATING AGENTS TO INCREASE THE FLEXURAL MODULUS OF IONOMERS

FIELD OF THE INVENTION

The present invention generally relates to ionomers modified with nucleating agents to improve flexural modulus.

BACKGROUND OF THE INVENTION

Ionomeric resins are copolymers containing non-ionic repeating units and smaller amounts of ion containing units. Various ionomeric resins and blends thereof (sold by E. I. DuPont de Nemours & Company under the trademark Surlyn®, and by the Exxon Corporation under the trademarks Escor® and Iotek®, among others) have been used as golf ball covers. Ionomer covers are generally more durable than the traditional "balata" (trans polyisoprene, natural, or synthetic) rubber covers. The softer balata covers, although exhibiting enhanced playability properties, lack the durability properties required for repetitive play.

Ionomeric resins are generally ionic copolymers of an olefin, such as ethylene, and a metal salt of an unsaturated carboxylic acid, such as acrylic acid, methacrylic acid, or maleic acid. In some instances, an additional softening monomer, such as an acrylate, can also be included to form a terpolymer. The pendent ionic groups in the ionomeric resins interact to form ion-rich aggregates contained in a non-polar polymer matrix. The metal ions, such as sodium, zinc, magnesium, lithium, potassium, calcium, nickel, manganese, copper, titanium, aluminum etc. are used to neutralize some portion of the acid groups in the copolymer, resulting in a thermoplastic elastomer exhibiting enhanced properties, i.e. improved durability, etc.

The ionomeric resins utilized to produce cover compositions can be formulated according to known procedures such as those set forth in U.S. Pat. No. 3,421,766 or British patent no. 963,380, with neutralization effected according to procedures disclosed in Canadian patent nos. 674,595 and 713,631, wherein the ionomer is produced by copolymerizing the olefin and carboxylic acid to produce a copolymer having the acid units randomly distributed along the polymer chain. Ionic copolymers generally comprise one or more α-olefins, and from about 9 to about 20 weight percent of α,β-ethylenically unsaturated mono- or dicarboxylic acid. The base copolymer is neutralized with metal ions to the extent desired.

The ionomeric resins utilized in the golf ball industry are generally copolymers of ethylene with acrylic (e.g. Escor®) and/or methacrylic (e.g. Surlyn®) acid. In addition, two or more types of ionomeric resins may be blended into the cover compositions in order to produce the desired properties of the resulting golf balls. Generally, ionomers in the mid-acid range have lower flexural modulus than the high-acid ionomers, and high acid ionomers also tend to be more brittle or less durable than mid-acid ionomers. However, the mid-acid ionomers are generally less expensive. Higher flexural modulus materials when used as an inner cover layer or outer cover layer reduce spin and increase coefficient of restitution at high swing speeds. Hence, there remains a need to modify mid-acid ionomers to increase flexural modulus.

SUMMARY OF THE INVENTION

The present invention relates to a golf ball that includes an ionomer composition modified to increase its flexural modulus.

The present invention also relates to a golf ball having an ionomer composition modified with at least one nucleating agent.

It is understood that both the forgoing general description and the following detailed description are exemplary and explanatory only, and are intended to provide a further explanation of the present invention, as claimed.

DETAILED DESCRIPTION OF THE INVENTION

"Copolymer" means polymers containing two or more different monomers. The terms "dipolymer" and "terpolymer" mean polymers containing only two and three different monomers respectively. The phrase "copolymer of various monomers" means a copolymer whose units are derived from the various monomers.

Flexural modulus is the ratio of stress to strain within the elastic limit (when measured in the flexural mode) and is similar to tensile modulus. This property is used to indicate the bending stiffness of a material. The flexural modulus, which is a modulus of elasticity, is determined by calculating the slope of the linear portion of the stress-strain curve during the bending test. The formula used to calculate the flexural modulus from the recorded load (F) and deflection (D) is:

$$E_B = \frac{3}{4} \frac{FL^3}{bd^3 D}$$

Wherein
L=span of specimen between supports (m);
b=width (m); and
d=thickness (m).

Flexural modulus can be determined or measured in accordance to ASTM D790 standard, among other protocols.

An ionomer is a thermoplastic polymer which includes acidic groups, such as carboxylate or sulfonate, or basic groups, such as quaternary nitrogen, the acidic or basic groups being at least partially neutralized with a conjugate acid or base. Negatively charged acidic groups, such as carboxylate or sulfonate, may be neutralized with a cation, such as a metal ion. Positively charged basic groups, such as quaternary nitrogen, may be neutralized with an anion, such as a halide, an organic acid, or an organic halide. Acidic or basic groups may be incorporated into an ionomer through copolymerization of an acidic or basic monomer, such as alkyl (meth)acrylate, with at least one other monomer, such as an olefin, styrene or vinyl acetate, followed by at least partial neutralization to form an ionomer. Alternatively, acidic or basic groups may be incorporated into a polymer to form an ionomer by reacting the polymer, such as polystyrene or a polystyrene copolymer including a block copolymer of polystyrene, with a functionalizing reagent, such as a carboxylic acid or sulfonic acid, followed by at least partial neutralization. Suitable metal ions include sodium, zinc, magnesium, lithium, potassium, calcium, nickel, manganese, copper, titanium, aluminum and etc.

Chemically, ionomer resins are a copolymer of an olefin and an alpha, beta ethylenically-unsaturated carboxylic acid having 10-90% of the carboxylic acid groups neutralized by a metal ion. See U.S. Pat. No. 3,264,272. Commercially available ionomer resins include, for example, copolymers of ethylene and methacrylic or acrylic acid neutralized with metal salts. These are sold by E. I. DuPont de Nemours and Co. under the trademark SURLYN® and by the Exxon Corporation under the trademark ESCOR® and the trademark IOTEK®. These ionomer resins are distinguished by the type of metal ion, the amount of acid, and the degree of neutralization.

The term "(meth)acrylate" refers to acrylic and/or methacrylic, for example, acrylic acid and/or methacrylic acid, or alkyl acrylate and/or alkyl methacrylate. In this connection, "ethylene/(meth)acrylic acid (abbreviated E/(M)AA)" means a copolymer of ethylene (abbreviated E)/acrylic acid (abbreviated AA) and/or methacrylic acid (abbreviated MAA), which can then be at least partially neutralized by one or more alkali metal, transition metal, or alkaline earth metal cations to form an ionomer.

The composition of the golf ball of the present invention includes at least a copolymer that includes a low to medium acid content, generally less than about 16% weight of acid, and a nucleating agent. Alternatively, the composition of the golf ball includes at least a copolymer that includes a high acid content, generally more than about 16% weight of acid, preferably from about 17% to about 25% by weight of a carboxylic acid, more preferably from about 18.5% to about 21.5% by weight of a carboxylic acid, and a nucleating agent. The composition of the present invention may be incorporated in forming the core, any intermediate layers, and/or the cover layer of the golf ball. Preferably, the composition of the present invention is incorporated in forming the intermediate or cover layer of the golf ball.

The copolymer of the present invention is a copolymer of $\alpha$-olefin, $C_3$ to $C_8$ $\alpha,\beta$-ethylenically unsaturated carboxylic acid and optional softening monomer, which is prepared by methods known to one skilled in the art. Copolymers may include, without limitation, ethylene acid copolymers, such as ethylene/(meth)acrylic acid, ethylene/(meth)acrylic acid/maleic anhydride, ethylene/(meth)acrylic acid/maleic acid mono-ester, ethylene/maleic acid, ethylene/maleic acid mono-ester, ethylene/(meth)acrylic acid/n-butyl (meth)acrylate, ethylene/(meth)acrylic acid/iso-butyl (meth)acrylate, ethylene/(meth)acrylic acid/methyl (meth)acrylate, ethylene/(meth)acrylic acid/ethyl (meth)acrylate terpolymers, and the like.

Preferably, the copolymer is an ionomeric resin. Ionomers for use in the invention may include melt-processable, at least partially neutralized copolymers of ethylene and $C_3$ to $C_8$ $\alpha,\beta$-ethylenically unsaturated carboxylic acids. Preferred ionomers for use in the present invention include E/(M)AA dipolymers having from about 2 to about 30 weight % (M)AA, at least partially neutralized by one or more alkali metal, transition metal, or alkaline earth metal cations. More preferably, the ionomer of the present invention includes E/(M)AA di-polymers having low to medium acid content. U.S. patent application publication no. 2005/0020741, which is incorporated herein by reference in its entirety, provides a list of copolymers that may be used in the present invention. The ionomer may contain from about 1 to about 99 wt. % neutralized copolymers of ethylene and $C_3$ to $C_8$ $\alpha,\beta$-ethylenically unsaturated carboxylic acids, and from about 1 to about 99 wt. % ethylene/(meth)acrylic acid.

Optionally, the ionomeric composition of the present invention includes a non-ionomeric thermoplastic polymer. Suitable non-ionomeric thermoplastic resins include, without limitation, thermoplastic elastomers, such as polyurethane, poly-ether-ester, poly-amide-ether, polyether-urea, Pebax™ (a family of block copolymers based on polyether-block-amide, commercially supplied by Atochem of Philadelphia, Pa.), styrene-butadiene-styrene (SBS) block copolymers, styrene-(ethylene-butylene)-styrene block copolymers, etc., polyamide (oligomeric and polymeric), polyesters, polyolefins including polyethylene, polypropylene, ethylene/propylene copolymers, etc., ethylene copolymers with various comonomers, such as vinyl acetate, (meth)acrylates, (meth)acrylic acid, epoxy-functionalized monomers, CO, etc., polycarbonates, acrylics, such as methyl methacrylate homopolymers or copolymers, polystyrene, polymers functionalized with maleic anhydride, epoxidization etc., either by copolymerization or by grafting, elastomers such as EPDM, metallocene catalyzed PE and copolymer, ground-up powders of the thermoset elastomers, etc.

Any method known to one skilled in the art may be used to make the ionomers of the present invention. Some exemplary methods for making ionomers are described in U.S. Pat. No. 3,262,272, which is incorporated herein by reference in its entirety. Ionomers with any acid content can be used in the present invention. Preferably, the ionomers of the present invention are low to medium acid ionomers. In general, ionic copolymers including up to about 16 percent acid are considered "low to medium acid" ionomers, while those including greater than about 16 percent acid are considered "high acid" ionomers. Examples of suitable low to medium acid ionomers include medium acid Surlyns®, such as Surlyn® 7940 and Surlyn® 8940, Escor® 4000/7030 and Escor® 900/8000. Escor® 4000/7030 and Escor® 900/8000 are described in U.S. Pat. Nos. 4,911,451 and 4,884,814, which are incorporated herein by reference in their entireties. Two or more ionomers can be blended to form the base polymer.

In the present invention, one or more nucleating agents are added to the ionomers, preferably, low to mid-acid ionomers. However, nucleating agents can also be added to high acid ionomers. Examples of the high acid methacrylic acid based ionomers found suitable for use in accordance with this invention include, but are not limited to, SURLYN 8220 and 8240 (both formerly known as forms of SURLYN AD-8422), SURLYN 9220 (zinc cation), SURLYN SEP-503-1 (zinc cation), and SURLYN SEP-503-2 (magnesium cation). According to DuPont, all of these ionomers contain from about 18.5 to about 21.5% by weight methacrylic acid. Examples of the high acid acrylic acid based ionomers suitable for use in the present invention also include, but are not limited to, the high acid ethylene acrylic acid ionomers produced by Exxon such as Ex 1001, 1002, 959, 960, 989, 990, 1003, 1004, 993, and 994, and Surlyn 6120(Mg), 8140, 8150(Na), 9120 and 9150 (Zn). The nucleating agents may be added to the ionomers in any number of ways known to one skilled in the art. Preferably, the nucleating agents are capable of modifying the properties of the ionomers, which are not amorphous by changing their semicrystalline nature, such as their degree of crystallinity and the distribution of crystallite sizes. Without being bound by any particular theory, typically a nucleating agent leads to greater uniformity in the rate of crystal growth and in the size, number, and type of crystals formed from the molten ionomer of the present invention. The more uniform crystalline texture produced by the added nucleating agent may result in increased flexural modulus.

The nucleating agent of is capable of increasing the flex modulus of the base ionomeric resin by up to about 10%, or more. In one example of the present invention, the nucleating agent of the present invention is capable of modifying the flexural modulus of a 15% acid ionomer blend to have the flexural modulus of a 19% acid ionomer blend.

Various nucleating agents can be incorporated into the composition of the present invention. The nucleating agent is added to the ionomeric resins in an amount sufficient to provide the desired modification of the crystal structure. Suitable nucleating agents include, but are not limited to, mineral nucleating agents and organic nucleating agents. Examples of mineral nucleating agents include, but are not limited to, carbon black, silica, kaolin, and talc. The organic nucleating agents include, but are not limited to, salts of aliphatic monobasic or di-basic acids or aryl/alkyl acids such as sodium succinate, sodium glutarate, sodium caproate, sodium 4-methylvalerate, aluminum phenyl acetate, and sodium cinnamate. Alkali metal and aluminum salts of aromatic and alicyclic carboxylic acids such as aluminum benzoate, sodium or potassium benzoate, sodium betanaphtholate, lithium benzoate, and aluminum tertiary-butyl benzoate also are suitable organic nucleating agents. Substituted sorbitol derivatives, such as bis (benzylidene) and bis (alkylbenzilidine) sorbitols, wherein the alkyl groups contain from about 2 to about 18 carbon atoms, are also suitable nucleating agents.

Preferably, suitable nucleating agents of the present invention include, but are not limited to, 1,3:2,4-bis(3,4-dimethylbenzylidene) sorbitol, c-endo-bicyclo[2.2.1]heptane-2,3-dicarboxylic acid, disodium salt, and/or amorphous silicon dioxide, 13-docosenamide (Z). Additionally, sorbitol derivatives such as 1,3,2,4-dibenzylidene sorbitol, 1,3,2,4-di-para-methylbenzylidene sorbitol, and 1,3,2,4-di-para-methylbenzylidene sorbitol are effective nucleating agents for polypropylenes. 1,2:2,4 bis(3,4-dimethylbenzylidene) sorbitol nucleating agent is commercially available, as Millad® 3988 from Milliken Chemical Co. C-endobicyclo[2,2.1]heptane-2,3-dicarboxylic acid nucleating agent is commercially available as HPN 68-L, also from Milliken. U.S. patent application Ser. No. 10/852,345, which is incorporated herein by reference in its entirety, provides several examples of nucleating agent that may be used in the present invention. The amount of nucleating agent incorporated into the composition of the present invention generally range from about 0.05% to about 0.25% of the composition. Preferably the amount of nucleating agent is from about 0.05% to about 0.15%. Preferably, the nucleating agent such as Millad® 3988 is in a powder form having a size of at least about 38 μm and has density in the range of about 725 kg/m$^3$.

An optional filler may be included in the thermoplastic composition of the present invention, e.g. to impart additional density to the ionomers or blends thereof with other materials. Preferred densities for the filled compositions include densities in the range starting with the density of unfilled polymer to about 1.8 gm/cc. Generally, the filler will be an inorganic material, having a density greater than about 4 gm/cc, preferably greater than 5 gm/cc, and is present in an amount of from about 0 to about 60 weight % based on the total weight of the composition. Examples of useful fillers include zinc oxide, barium sulfate, lead silicate and tungsten carbide, tin oxide, as well as the other well known corresponding salts and oxides thereof. It is preferred that the filler materials be non-reactive or almost non-reactive with the polymer components described above when the ionomers are less than completely neutralized. If the ionomers are fully neutralized, reactive fillers may be used. Zinc oxide grades, such as grade XX503R, are available from Zinc Corporation of America of Monaca, Pa., which do not react readily with any free acid to cause cross-linking.

Other additives suitable for use in the present invention include but are not limited to, titanium dioxide, which may be used as a whitening agent or filler, other pigments, optical brighteners, surfactants, processing aids, or the like.

EXAMPLES

The following examples and comparative examples further illustrate the present invention in detail, but are not to be construed to limit the scope of the present invention.

A 50/50 blend of Surlyn® 7940 and Surlyn® 8940 were blended together to form the base polymer. As illustrated in Table 1, below, nucleating agent Millad® 3988 was added to blends 1, 2, and 3 in an amount of 0.05%, 0.1%, and 0.15%, respectively. Furthermore, as illustrated in Table 1, nucleating agent HPN® 68-L was added to blends 4, 5, and 6 in an amount of 0.05%, 0.1%, and 0.15%, respectively. The results are illustrated in Table 1 below:

TABLE 1

| Composition Components | Blend 1 | Blend 2 | Blend 3 | Blend 4 | Blend 5 | Blend 6 | Control |
|---|---|---|---|---|---|---|---|
| Surlyn ® 7940 ionomer | 50% | 50% | 50% | 50% | 50% | 50% | 50% |
| Surlyn ® 8940 ionomer | 50% | 50% | 50% | 50% | 50% | 50% | 50% |
| Millad ® 3988 nucleating agent | 0.05% | 0.1% | 0.15% | | | | 0% |
| HPN ® 68-L nucleating agent | | | | 0.05% | 0.1% | 0.15% | 0% |
| Flex Modulus @40 hrs, ksi | 60.2 | 59 | 51.1 | 53.4 | 59.1 | 54.5 | 51.3 |
| Flex Modulus @2 wks, ksi | 77 | 72.5 | 71.5 | 69.5 | 74.1 | 71.5 | 70.2 |

As illustrated in Table 1 above, the control had a 50/50 blend of ionomers Surlyn® 7940 and Surlyn® 9840 without any nucleating agents. This blend resulted in having a flexural modulus of 51.3 ksi at 40 hours and a flexural modulus of 70.2 ksi at two weeks.

In comparison, Blends 1, 2, and 3, in addition to having a 50/50 blend of ionomers Surlyn® 7940 and Surlyn® 9840, included 0.05%, 0.1%, and 0.15% of the nucleating agent Millad® 3988, respectively. The flexural modulus of Blend 1 at 40 hours was 60.2 ksi and at two weeks was 77 ksi, which are about 17% and 9.7% higher than the flexural modulus of the control at 40 hours and at two weeks, respectively. With respect to Blend 2, the flexural modulus at 40 hours was 59 ksi and at two weeks was 72.5 ksi, which are about 15% and 3.3% higher than the flexural modulus of the control at 40 hours and at two weeks, respectively. Flexural modulus of Blend 3 at 40 hours was 51.1 ksi and at two weeks was 71.5 ksi, which are about the same within measurement uncertainty and 1.9% higher than the flexural modulus of the control at 40 hours and at two weeks, respectively.

Blends 4, 5, and 6, in addition to having a 50/50 blend of ionomers Surlyn® 7940 and Surlyn® 9840, included 0.05%, 0.1%, and 0.15% of the nucleating agent HPN® 68-L, respectively. The flexural modulus of Blend 4 at 40 hours was 53.4 ksi and at two weeks was 69.5 ksi, which are about 4.1% higher and 1% lower or within measurement uncertainty than the flexural modulus of the control at 40 hours and at two weeks, respectively. With respect to Blend 5, the flexural modulus at 40 hours was 59.1 ksi and at two weeks was 74.1 ksi, which are about 15.2% and 5.5% higher than the flexural modulus of the control at 40 hours and at two weeks, respectively. Flexural modulus of Blend 6 at 40 hours was 54.5 ksi and at two weeks was 71.5 ksi, which are about 6.2% and 1.9% higher than the flexural modulus of the control at 40 hours and at two weeks, respectively.

While two ionomer blends are represented in the examples, the present invention is not limited thereto. One ionomer systems and three or more ionomer systems can also be used. Other non-ionomeric polymers can also be included.

Other than in the operating examples, or unless otherwise expressly specified, all of the numerical ranges, amounts, values and percentages, such as those for amounts of materials and others in the specification, may be read as if prefaced by the word "about", even though the term "about" may not expressly appear with the value, amount or range. Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Furthermore, when numerical ranges of varying scope are set forth herein, it is contemplated that any combination of these values inclusive of the recited values may be used.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalent thereof.

What is claimed is:

1. A golf ball comprising a core, a cover layer, and optionally at least one intermediate layer disposed between the core and the cover layer, wherein at least one portion of the ball comprises an ionomer composition modified with a nucleating agent, and wherein the nucleating agent is a sorbitol derivative.

2. The golf ball of claim 1, wherein the ionomer composition comprises at least two ionomers.

3. The golf ball of claim 1, wherein the nucleating agent is in a powder form.

4. The golf ball of claim 1, wherein the ionomer composition is partially or fully neutralized with metal ions.

5. The golf ball of claim 4, wherein the metal ions comprise Zn, Na, Li, K, Ca, Mg, Ni, Mn, Cu, Ti, Al, or a combination thereof.

6. The golf ball of claim 1, wherein the nucleating agent is capable of increasing the flexural modulus of the ionomer composition.

7. The golf ball of claim 1, wherein the sorbitol derivative is selected from the group consisting of bis (benzylidene) and bis (alkylbenzilidine) sorbitols, wherein the alkyl group of alkylbenzilidine includes from 2 to 18 carbon atoms.

8. The golf ball of claim 1, wherein the sorbitol derivative is selected from the group consisting of 1,3,2,4-dibenzylidene sorbitol, 1,3,2,4-di-para-methylbenzylidene sorbitol, 1,3,2,4-di-para-methylben-zylidene sorbitol, and combinations thereof.

* * * * *